United States Patent [19]

Grow

[11] Patent Number: 4,477,356
[45] Date of Patent: Oct. 16, 1984

[54] EMULSION SEPARATION METHOD AND APPARATUS

[76] Inventor: Harlow B. Grow, 16530 Chattanooga Pl., Pacific Palisades, Calif. 90272

[21] Appl. No.: 7,989

[22] Filed: Jan. 31, 1979

[51] Int. Cl.³ .............................................. B01D 17/04
[52] U.S. Cl. .................... 210/741; 210/805; 210/182
[58] Field of Search .............................. 208/187–188; 203/10, 11, 12; 210/73 W, 181, 182, 539, 56, 741, 805; 252/328, 346, 362

[56] References Cited

U.S. PATENT DOCUMENTS

| | | | |
|---|---|---|---|
| 1,611,370 | 12/1926 | Primrose | 252/362 |
| 1,983,832 | 12/1934 | Bailey | 252/362 |
| 3,318,803 | 5/1967 | Broughton | 203/12 |
| 3,619,416 | 11/1971 | Hendry | 208/187 |
| 3,876,538 | 4/1975 | Hess et al. | 210/63 R |
| 3,920,548 | 11/1975 | Fassell et al. | 210/63 R |
| 3,962,076 | 6/1976 | Hess et al. | 210/63 R |
| 4,032,412 | 6/1977 | Hoppe et al. | 210/180 |

FOREIGN PATENT DOCUMENTS 1810630 8/1970 Fed. Rep. of Germany ...... 252/346

*Primary Examiner*—Frank Spear
*Attorney, Agent, or Firm*—William H. Maxwell

[57] ABSTRACT

Method and apparatus for the separation of oil from water in an emulsion thereof, by inducing the oil-water emulsion into an elongated chamber at a temperature below the boiling point of water, and by recirculating a portion of the emulsion oil through the chamber at a boiling temperature well below the refining temperature of the oil, drawing off the product oil from the chamber end remote from said induction end thereof, and drawing off the water by-product as steam from the chamber above a controlled liquid level of emulsion-oil therein, waste heat from the product and by-product being conserved.

24 Claims, 1 Drawing Figure

U.S. Patent　　Oct. 16, 1984　　4,477,356
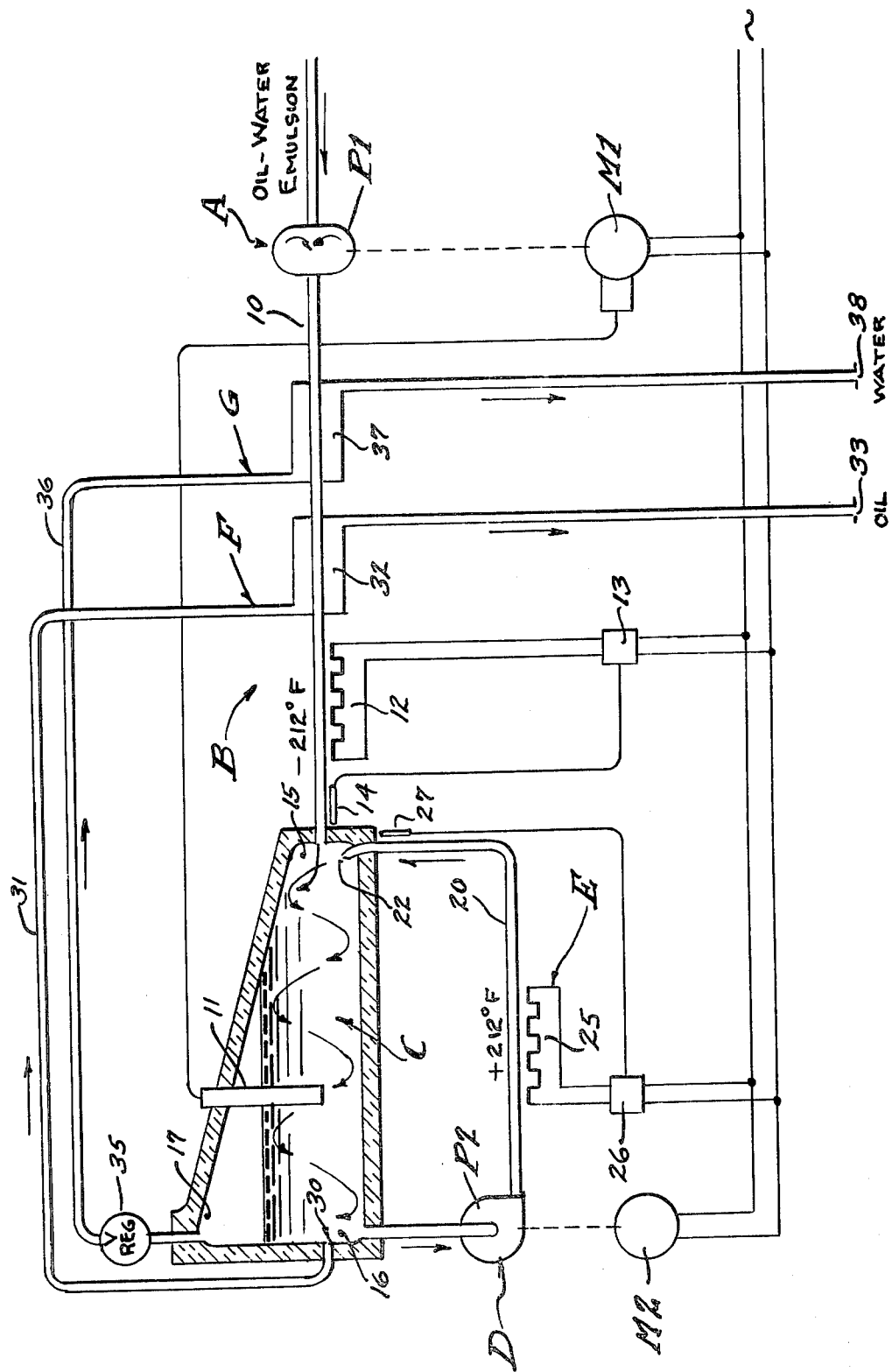

EMULSION SEPARATION METHOD AND APPARATUS

BACKGROUND

Mixtures of finely divided globules of one liquid in another are referred to herein generally as an emulsion, it being understood that a suspension of differing liquids is involved as distinguished from solutions wherein a mixture is formed by dissolving two or more liquids together. Such an emulsion which requires separation is an emulsion of oil in water, for example a shale oil emulsion as produced by my Method and Apparatus for Acquisition of Shale Oil as is disclosed in U.S. Pat. No. 4,151,067 issued Apr. 24, 1979. The oil recovered thereby is a natural hydrocarbon obtained from the processing of oil shale or tar sands, by particulating the shale or sand and separating the same from said oil by means of emulsification in water. Therefore, it is an object of this invention to provide a method and apparatus for the further separation of the oil-water emulsion into the distinct and separately identifiable hydrocarbon substance and liquid carrier of which it is comprised.

Water is a liquid that is known to boil at 212° F. and vaporize into its gaseous state of steam, while hydrocarbons such as oil is known to be retorted at 900°–1000° F. well below its refining temperatures. It is this diversity between the boiling temperature of water and the refining temperature of hydrocarbons which is utilized herein to separate the heavier water carrier from the lighter oil globules, by distillation which involves vaporizing and subsequently condensing the former after it is liberated out of the latter. Heretofore, retorts and boilers have been employed to heat the liquid mixture into the distillation temperatures, for example to drive off the water as a steam vapor, but with problems bearing upon scaling deposits and the extraction of said oil. It is an object of this invention to provide a dynamic process and apparatus therefor which continuously discharges the separated oil and water, without using retorts or boilers. With the present invention, the emulsion supply is brought to a temperature less than boiling of the water carrier, and an oil heating media is brought to a temperature greater than the boiling temperature of water but less than the refining temperature of the said oil media. Since the boiling and/or refining temperature is not reached in either case, there can be no scaling or residue deposits as is the usual case in retorts and boilers.

The liquid emulsion and liquid heating media are brought together by the present invention to admix and comingle as they are transported by fluid flow thereof through an elongated separator comprised of an insulated closure from which oil and water vapors (steam) are separately discharged. The higher temperature heating media is recirculated emulsion oil which acts upon the emulsion input of lower temperature to vaporize the water content thereof from the oil globule content thereof, all of which progresses dynamically through the separator while the water vapor (steam) is liberated and rises to be discharged at a low pressure sufficient to induce flow. The discharge steam vapor is condensed into substantially pure water and heat recovery applied therefrom to the input emulsion. The flow level and pressure is controlled within the separator for the continuous discharge of product oil, and circulation of the input emulsion and heating media oil is induced by pumping, respectively. The product oil emerges from the separation chamber at the boiling temperature of water and heat recovery is applied therefrom to the input emulsion subsequent to the aforesaid recovery from condensing said steam discharge, thereby bringing the input emulsion to a temperature close to boiling. Thus, the product oil is delivered at low temperature, as is the by-product water which is employed usefully in the emulsion acquisition process of said U.S. Pat. No. 4,151,067.

SUMMARY OF INVENTION

This invention relates to the separation of oil from water supplied as an emulsion thereof and involves minimal application of heat as necessary to vaporize the water carrier into steam, by the induction of a continuous flow of oil-water emulsion into an elongated separating chamber at a temperature below boiling of water, and by the continuous recirculation through the separating chamber of a portion of the chamber discharge oil reapplied thereto at boiling temperature. The boiling of water into steam vapor is confined to the flow of emulsion and heating media oil and the residues resulting therefrom are carried off in the oil product for further refinement as circumstances require. There is no heat application applied through the walls of the separating chamber, no retort, and consequently no build-up of scale deposits therein; as is usual in retorts and boilers. Accordingly, there is separate heating of the emulsion input and of the recirculated heating media, both of which are pumped through the separating chamber at a determined rate, the emulsion supplied so as to maintain a normal level of liquid in the separating chamber, and the heating media so as to maintain an effective boiling temperature when comingled with the emulsion moving through and discharging as product oil from the separating chamber. The level and pressure of liquid is controlled within the separating chamber in order to govern the oil product discharge, and heat exchange is employed in order to regain waste heat from the oil product and water by-product discharges. Each of the foregoing method steps is carried out by apparatus means, all as hereinafter disclosed.

DRAWINGS

The various objects and features of this invention will be fully understood from the following detailed description of the typical preferred form and application thereof, throughout which description reference is made to the accompanying drawing, a schematic diagram of the method and apparatus herein disclosed.

PREFERRED EMBODIMENT

Referring now to the drawing, it is a separation of liquid hydrocarbons from a water emulsion thereof which is the general object of this invention. The method is carried out by apparatus which comprises in process sequence; oil-water emulsion induction as by means A, emulsion heating as by means B, movement through a chamber such as an elongated separating chamber C, oil recirculation as by means D, superheating of heating media as by means E, product oil discharge and heat recovery as by means F, and by-product water discharge and heat recovery as by means G.

The method and apparatus operates continuously as distinguished from batch processing and is conducted with discriminate application of heat by the two separate means provided therefor. In carrying out this invention, the emulsion supply is continuously induced at a low temperature below the boiling point of water (at the chamber pressure) and a portion of the emulsion oil is continuously recirculated at a high temperature substantially above said boiling point but well below the refining temperature of the oil. A feature is the admixture of the emulsion oil as a superheating media with the incoming emulsion, whereby vaporization takes place only within the moving liquid body, and impurities are carried off by the product oil and not deposited as scale or the like, and the steam discharged for subsequent condensation into high quality by-product water.

The first step of the process is to induce the flow of an emulsion of oil and water into one end of an elongated separating chamber, providing a supply thereof on demand. The apparatus means A performing this step of the process is embodied in an induction line 10 and pump P1 operated by a motor M1 controlled by a liquid level sensor 11. The sensor 11 operates in the elongated separating chamber C to maintain a liquid level therein.

The second step of the process is to preheat the induced emulsion of oil and water to a sub-boiling or low temperature below the boiling point of water at the working pressure within the said elongated separating chamber. The apparatus means B performing this step of the process may vary in form and is shown embodied in an electrically energized heater 12 controlled by a thermostat 13 responsive to a probe 14 determining the induction temperature of the emulsion into the elongated separating chamber C. In practice, the temperature of induction is just below that required for boiling within the liquid as it progresses through and moves longitudinally of the chamber.

The third step of the process is to pass the emulsion of oil and water longitudinally of the elongated chamber for progressively boiling and vaporizing therefrom the water content of the emulsion, for its reduction to an oil end product at the other end of said closed chamber remote from said induction end thereof. The apparatus means C performing this step of the process is a closed chamber shown as comprised of insulated walls extending between an induction end 15 and a discharge end 16, there being a rising dome 17 toward the discharge end to accumulate steam vapors as they are liberated from the progressing emulsion-oil flow. As shown, the aforesaid level sensor 11 enters the elongated separator chamber C to control the level of liquid therein and thereby establish a uniform head of pressure for the controlled rate of oil product discharge.

The fourth step of the process is to recirculate a portion of the emulsion oil as a heating media from the discharge end of the elongated separating chamber and into the induction end thereof, injected therein for admixture into the induced emulsion so as to comingle with the same. The apparatus means D performing this step is a closed circuit flow line 20 between the opposite ends of the elongated separating chamber C, and includes a pump P2 operated by a motor M2 with line 20 in open communication with the induction and discharge ends of the chamber C. The pump P2 is a continuously running pump that transfers the heating media above the boiling point of water and into the emulsion at the induction end of the chamber. The thorough admixture of recirculated heating media and incoming emulsion is by means of a nozzle 22 discharging the heating media laterally into the chamber at a canted angle and at a velocity so as to cause helical agitation progressing toward the discharge end 16 of the chamber C, as indicated.

The fifth step of the process is to superheat the recirculating heating media to a boiling temperature of the water content of the emulsion at the working pressure within the said elongated separating chamber. In carrying out this invention the heating media is pumped into the emulsion at a temperature substantially higher than a water boiling temperature, so that heat absorption by said emulsion induced at sub-boiling temperature will equalize at a boiling temperature or higher as may be required. The apparatus means E performing this step of the process may vary in form and is shown embodied in an electrically energized heater 25 controlled by a thermostat 26 responsive to a probe 27 detecting the injection temperature of the heating media into the elongated separating chamber C. In practice, the temperature of the heating media oil is well above the boiling point of water at the pressure within the separating chamber, thereby to ensure an accelerated change in temperature and an efficient vaporization action.

The sixth step of the process is to discharge product oil from the end of the elongated separating chamber remote from the first mentioned induction end thereof, to recover heat therefrom, and providing a continuous supply thereof. The apparatus means F performing this step of the process may vary in form and is shown as a single orifice 30 opening from the discharge end of the elongated separating chamber C and into a discharge line 31 routed through a heat exchanger 32 through which the aforesaid induction line 10 passes ahead of the heater 12 of means B. Accordingly, a substantial amount of heat is recovered from the product oil prior to its delivery at 33. The oil discharge line 31 and heat exchanger 32 are insulated (not shown) so as to conserve heat.

The seventh step of the process is to discharge steam from the chamber of the elongated separating chamber C, controlling the pressure thereof, to recover heat therefrom, and providing a continuous supply thereof. The apparatus means G performing this step of the process may vary in form and is shown as a pressure recirculating valve 35 opening from the top of the dome 17 of the separating chamber C and into a discharge line 36 routed through a condensor 37 through which the aforesaid induction line 10 passes ahead of the above described heat exchanger 32. Accordingly, a substantial amount of heat is recovered from the by-product vapor-to-water condensation prior to its delivery at 38. The steam-water discharge line 36, valve 35 and condensor 37 are insulated (not shown) so as to conserve heat.

From the foregoing it will be seen that a dynamic method and apparatus is provided for the continuous separation of a hydrocarbon and water emulsion, by recirculation and admixing of a portion of the end product oil with the controlled induction of the emulsion. Said portion of end product oil is superheated and becomes a heating media brought to a water boiling temperature, and the emulsion is preheated by heat recovery means from both the product oil and by-product steam-water, and supplemented as circumstances require by means that restricts the preheat temperature to less than the boiling temperature of the water at the operating pressure within the chamber. A feature is that the heating process does not involve retorts or boilers, the water content of the emulsion being subjected to the boiling process within the body of said liquid emulsion moving progressively through the elongated separating chamber.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. A process for separating oil from a water emulsion thereof, and including;

the first step of oil-water emulsion induction, the second step of preheating the emulsion to a temperature below boiling of the water content in the induction emulsion, the third step of moving the preheated emulsion progressively through an entirely open separating chamber from an induction end to a discharge end, the fourth step of recirculating emulsion oil by admixing the same with the progressively moving emulsion by injection thereof into the induction end of the separating chamber, the fifth step of superheating the recirculating emulsion oil to a temperature above boiling of the water content in the emulsion moving progressively through the separating chamber, the sixth step of discharging product oil from the discharge end of the separating chamber, and the seventh step of discharging by-product steam from the emulsion moving progressively through the separating chamber.

2. The process for separating oil from a water emulsion thereof as set forth in claim 1, wherein the first step of induction induces the oil-water emulsion on demand.

3. The process for separating oil from a water emulsion thereof as set forth in claim 1, wherein the second step of preheating the emulsion is by temperature controlled heating at the induction end of the separating chamber.

4. The process for separating oil from a water emulsion thereof as set forth in claim 1, wherein the third step of moving the preheated emulsion progressively through the separating chamber is by reaction from the first step of induction inducing the oil-water emulsion on demand.

5. The process for separating oil from a water emulsion thereof as set forth in claim 1, wherein the fourth step of recirculating emulsion oil is by continuous pumping.

6. The process for separating oil from a water emulsion thereof as set forth in claim 1, wherein the fourth step of recirculating emulsion oil includes nozzling the same at an admixing velocity into the progressively moving emulsion at the induction end of the separating chamber.

7. The process for separating oil from a water emulsion thereof as set forth in claim 1, wherein the fifth step of superheating the recirculating emulsion is by temperature controlled heating at the injection thereof into the induction end of the separating chamber.

8. The process for separating oil from a water emulsion thereof as set forth in claim 1, wherein the sixth step of discharging product oil is by pressure applied from at least one of the following, the induction supply of oil-water emulsion on demand, and the steam by-product pressure in the separating chamber.

9. The process for separating oil from a water emulsion thereof as set forth in claim 1, wherein the sixth step of discharging product oil is by a controlled level of emulsion moving progressively through the separating chamber.

10. The process for separating oil from a water emulsion thereof as set forth in claim 1, wherein the sixth step of discharging oil is by a controlled level of emulsion moving progressively through the separating chamber under controlled pressure applied from at least one of the following, the induction supply of oil-water emulsion on demand, and the steam by-product pressure in the separating chamber.

11. The process for separating oil from a water emulsion thereof as set forth in claim 1, wherein the seventh step of discharging by-product steam is by controlled pressure release thereof from the separating chamber.

12. The process for separating oil from a water emulsion thereof as set forth in claim 1, wherein the first step of induction induces the oil-water emulsion on demand, wherein the second step of preheating the emulsion is by temperature controlled heating at the induction end of the separating chamber, wherein the third step of moving the preheated emulsion progressively through the separating chamber is by reaction from the first step of induction inducing the oil-water emulsion on demand, wherein the fourth step of recirculating emulsion oil is by continuous pumping recirculating emulsion oil and nozzling the same at an admixing velocity into the progressively moving emulsion at the induction end of the separating chamber, wherein the sixth step of discharging oil is by a controlled level of emulsion moving progressively through the separating chamber under controlled pressure applied from the induction supply of oil-water emulsion on demand and by the steam by-product pressure in the separating chamber, and wherein the seventh step of discharging by-product steam is by controlled pressure release thereof from the separating chamber.

13. An apparatus for separating oil from a water emulsion thereof, and including;

induction means inducing the flow of a water-oil emulsion, preheating means bringing the induced flow of emulsion to a temperature below boiling of the water content therein, an elongated entirely open separating flow chamber having an induction end open to and receiving flow of emulsion from the induction means and having a discharge end to deliver emulsion oil, emulsion oil recirculating means admixing emulsion oil into the emulsion induction means at the induction end of the separating flow chamber and removing a portion of emulsion oil from the discharge end of said chamber, superheating means bringing the recirculating emulsion oil to a temperature above boiling of the water content in the emulsion flow through the chamber, product oil discharge means from the discharge end of the chamber, and by-product steam discharge means from the chamber between the induction and discharge ends thereof.

14. The apparatus for separating oil from a water emulsion thereof as set forth in claim 13, wherein the induction means comprises a pump supplying the oil-water emulsion on demand.

15. The apparatus for separating oil from a water emulsion thereof as set forth in claim 13, wherein the preheating means comprises a temperature controlled heater means responsive to temperature sensing means at the separating chamber.

16. The apparatus for separating oil from a water emulsion thereof as set forth in claim 13, wherein the emulsion oil recirculating means comprises a continuously operating pump means in a transfer line in open communication between the discharge and induction ends of the separating chamber.

17. The apparatus for separating oil from a water emulsion thereof as set forth in claim 13, wherein the emulsion oil recirculating means includes a mixing nozzle directed into and canted helically with respect to the elongated separating chamber.

18. The apparatus for separating oil from a water emulsion thereof as set forth in claim 13, wherein the emulsion oil recirculating means comprises a continuously operating pump means in a transfer line from the discharge end of the induction chamber and a mixing nozzle directed into the induction end of the separating chamber and canted helically with respect thereto.

19. The apparatus for separating oil from a water emulsion thereof as set forth in claim 13, wherein the superheating means comprises a temperature controlled heater means responsive to temperature sensing means at the emulsion induction end of the separating chamber.

20. The apparatus for separating oil from a water emulsion thereof as set forth in claim 13, wherein the product oil discharge means comprises an orifice discharging product oil under pressure in the separating chamber.

21. The apparatus for separating oil from a water emulsion thereof as set forth in claim 13, wherein emulsion level control means governs the induction means supplying the oil-water emulsion on demand, to govern the pressure discharge of product oil through an orifice at the discharge end of the separating chamber.

22. The apparatus for separating oil from a water emulsion thereof as set forth in claim 13, wherein pressure regulating means governs the steam pressure in the separating chamber, to govern the pressure discharge of product oil through an orifice at the discharge end of the separating chamber.

23. The apparatus for separating oil from a water emulsion thereof as set forth in claim 13, wherein emulsion level control means governs the induction means supplying the oil-water emulsion on demand, and wherein pressure regulating means governs the steam pressure in the separating chamber, to govern the pressure discharge of product oil through an orifice at the discharge end of the separating chamber.

24. The apparatus for separating oil from a water emulsion thereof as set forth in claim 13, wherein the induction means comprises a pump supplying the oil-water emulsion on demand, wherein the preheating means comprises a temperature controlled heater means responsive to temperature sensing means at the induction end of the chamber, wherein the emulsion oil recirculating means comprises a continuously operating pump means in a transfer line from the discharge end of the induction chamber and a mixing nozzle directed into the induction end of the separating chamber and canted helically with respect thereto, wherein the superheating means comprises a temperature controlled heater means responsive to temperature sensing means at the emulsion induction end of the separating chamber, wherein emulsion level control means governs the induction means supplying the oil-water emulsion on demand and pressure regulating means governs the steam pressure in the separating chamber to govern the pressure discharge of product oil through an orifice at the discharge end of the separating chamber, and wherein a condensor means converts the steam to by-product water.

* * * * *